March 1, 1960

S. BLUMKIN 2,926,711

FOOD SLICER GAUGE PLATE THRUST AND
SAFETY INDEXING MECHANISM

Filed July 14, 1958

INVENTOR.
Sidney Blumkin
BY
ATTORNEY.

United States Patent Office 2,926,711
Patented Mar. 1, 1960

2,926,711

FOOD SLICER GAUGE PLATE THRUST AND SAFETY INDEXING MECHANISM

Sidney Blumkin, New York, N.Y., assignor to Henry J. Talge

Application July 14, 1958, Serial No. 748,525

8 Claims. (Cl. 146—102)

This invention relates to food slicing machines of the type which are operable, upon reciprocation of a food carrying carriage in relation to a blade, to reduce bulk food items to a plurality of slices of gauged thickness and refers more particularly to means making it possible to quickly and accurately shield and cover the blade edge whenever slicing is finished and during times when the machine is not being used.

In food slicers of the type here concerned the thickness of the slice or cut is controlled by means of an adjustable gauge plate or thickness guide. This plate or guide stands to one side of the blade and is parallel therewith. The guide is shifted in a direction normal to the blade in order to change the thickness of a slice. In the past, it has been conventional to employ a normal thrust screw arrangement with a hand crank or knob for this purpose.

One of the objects of the present invention is to provide an improved thrust mechanism for shifting the thickness guide. The distinguishing feature of the mechanism as compared with the previously known thrust screw arrangement is in the employment of linear motion of the elements rather than the turning or cranking movement required in the past.

In many machines of which I am aware the edge of the slicing blade, except in the area where it is to engage the food, is shrouded or housed around a major portion of the circumference of the blade, only sufficient edge being left exposed to permit the slicing operation. This exposed edge portion, however, constitutes an ever-present danger to both children and adults. The danger can be eliminated by returning the gauge plate after slicing is finished to a position in which it is coplanar with the blades. In this location that portion of the gauge plate which is adjacent the blade prevents edge-wise contact with the blade. In the usual machine, however, there is no way other than by sight alone to index the thickness guide or gauge plate in the coplanar position described. Besides, there is nothing to prevent the displacing of the guide from this blade shielding position by absent-minded manipulation of the thrust mechanism by either adults or children.

The present invention has for another of its objects the provision of a food slicing machine which includes the improved thrust mechanism described above and which features means for indexing and releasably locking the thickness guide in a preselected safety position with reference to the rest of the machine. In the preferred embodiment of this mechanism the locking is completely automatic, the locking mechanism being operated responsive to the movement of the thickness guide and thrust mechanism into the position in which the thickness guide effectively shields the exposed edge portion of the blade.

Another important object of the invention is to provide a machine of the character described in which the locking mechanism is so located and constructed as to make the release of the guide or gauge plate for movement to a slicing position a simple matter.

A further object of the invention is to provide a machine of the character described in which the indexing and locking of the thickness guide in the safety position is positive and automatic, in which the parts are few and simple in construction, which can be manufactured at low cost, and which is capable of withstanding years of rugged use.

Other and further objects of the invention together with the features of novelty appurtenant thereto will appear in the course of the following description.

In order that a clearer understanding of this invention may be had, attention is hereby directed to the accompanying drawings forming a part of this application and illustrating a preferred embodiment of the invention and in which.

Like reference numerals indicate like parts in the various views.

Figure 1:
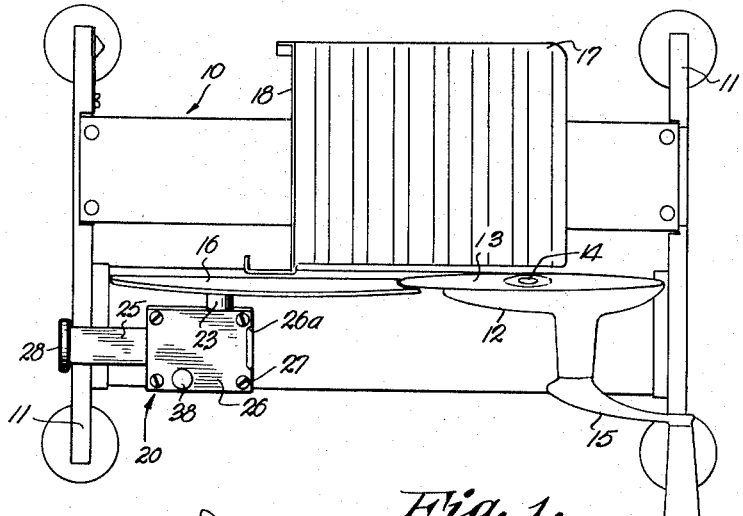
Fig. 1 is a top plan view of a slicing machine embodying the invention.
Figures 2, 3:
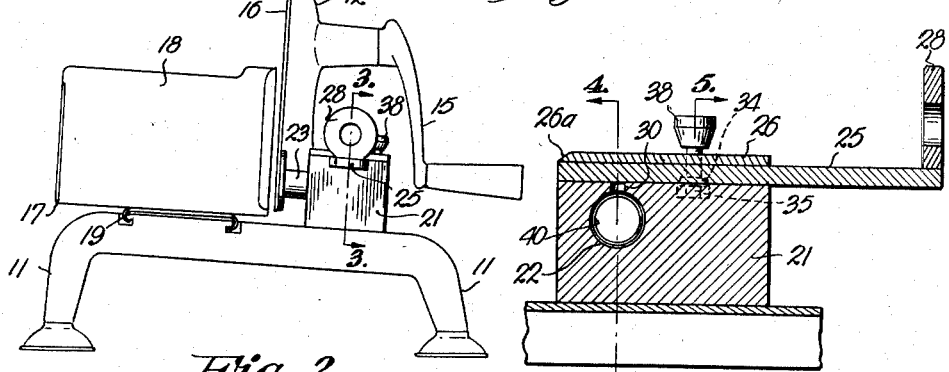
Fig. 2 is an end elevation taken from the left-hand end of Fig. 1.
Fig. 3 is an enlarged fragmentary sectional view taken generally along the line 3—3 of Fig. 2 in the direction of the arrows.

Referring to the drawings and initially to Figs. 1 and 2, the general arrangement of the meat slicing device shown is known to the art. Conventional features are the base 10 supported by the legs 11, which in this case form the terminal ends of the two U-shaped members at opposite ends of the base. On the base there is mounted a stationary support and housing 12 which carries a sharp edge vertically disposed circular slicing blade 13. Blade 13 is supported for rotation by axis 14, being operable through the medium of a hand crank 15. The housing 12 is provided with an upper portion such that it overhangs and shields the edge of the blade through somewhat better than 180 degrees of the circumference of the blade, leaving only the edge of the blade exposed which can be viewed from the left-hand side of Fig. 1.

Supported in parallelism with the blade and to one side therof is an upstanding plate-like member 16 known as the thickness guide or gauge plate. As will be explained in greater detail hereinafter, this guide is adjustable so as to shift it toward or away from the plane of the blade. Preferably the guide is so formed that its blade adjacent edge is curved to conform with the curvature of the blade so that when the guide is in the plane of the blade (as illustrated in Figs. 1 and 2) the arcuate edge portion of the guide will lie closely adjacent to and protect and shield the exposed edge portion of the blade, that is, the portion of the blade not concealed within or covered by the housing.

Supported on the base adjacent the guide 16 is the usual food platform or carriage 17 which is movable in directions transverse to the axis of the blade 15 so as to advance food toward the blade parallel to guide 16 to form a cut and to withdraw the food to prepare it for another cut. The carriage has on its rear or trailing edge an upstanding vertical flange 18 which is disposed normal to the path of travel of the carriage and preferably extends across the width of the carriage. Any suitable track mechanism such as indicated at 19 may be utilized to support the carriage for reciprocation in the fashion described.

The elements described thus far will be recognized as conventional. In the ordinary operation of the unit of the type described, the food body (such as, for example, a roast) is placed on the carriage 17 and butted against the thickness guide 16. The carriage is then moved toward the blade (in Fig. 1 it is shown in the position it would occupy about the middle of a cut of a large roast) to bring the food body into contact with the blade; as the blade is rotated and the carriage further advanced, a slice is separated, the slice moving to the outside of the housing 12. As previously mentioned, by adjusting the plate 16 toward or away from the plane of blade 13, the thickness of the slice can be controlled as desired.

The means for bringing about the shifting of thickness guide 16 and which forms a part of the present invention is shown generally at 20. The main body of this means comprises a block-like unit 21 which is rigidly fixed to the base 10 in any suitable fashion. Formed within this block on that side facing the guide 16 is a cylindrical passageway 22 which, in the preferred embodiment extends through the major portion of the block 21. Slidably received within this passage is a stem 23 which is rigidly affixed to the thickness guide 16 in any suitable fashion, for example, mounting plate 24. As will be evident, the housing or block 21 thus provides support for the thickness guide 16 through the medium of stem 23 and bearing 22.

Extending also through block 21 and lying crosswise above the passageway 22 and stem 23, is an elongate slide element 25. Preferably this slide element is rectangular in cross section and is received in a like recess formed in the top of the block 21. This recess extends from one end of the block to the other so that slide element 25 can be shifted back and forth (that is from left to right and right to left as viewed in Fig. 3) as desired. The slide element is in turn covered by a cover plate 26 which can be secured to the block 21 by any means desired such as, for example, the machine screws 27 at the four corners of the block. For easy manipulation the slide element 25 is provided with a handle 28 in the form of an upstanding ring-like flange.

As has been earlier mentioned, the shifting of the flange 16 is accomplished through movement of the slide element 25 back and forth in its guiding recess. The drive connection between the slide element and the stem 23 comprises a pin 29 extending upwardly from the stem and through an elongate slot 30 which communicates with the recess in which the slide element 25 moves. The slot 30 is of sufficient width to permit free movement therealong of pin 29 but still narrow enough to prevent any substantial or appreciable rotation of stem 23. The length of the slot is substantially equal to the maximum displacement to be permitted the thickness guide 16.

Figure 4:
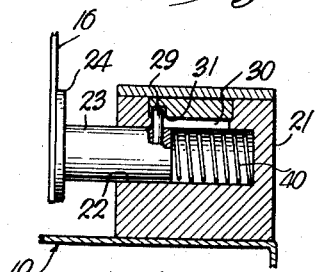
Fig. 4 is a fragmentary sectional view taken generally along the line 4—4 of Fig. 3 in the direction of the arrows.

As is evident from Fig. 4, the pin 29 extends well into the slide element recess and its upper end is received within a slot 31 formed in the underside of slide element 25. This slot 31 is inclined with respect to a plane normal to the stem 23 so that upon movement of the slide element a force directed axially of stem 23 will be applied to the stem. The preferred configuration of the slot is shown in Fig. 7, which illustrates the underside of slide element 25.

Figure 6:
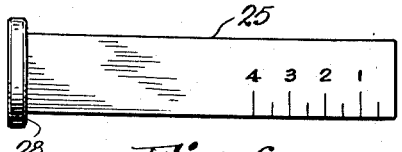
Fig. 6 is a plan view of the slide element of the thrust mechanism disassociated from its remaining parts and the standard.

In all of the figures of the drawings, the slide element is shown in the safety position for the machine, that is, the position in which the guide 16 is coplanar with the edge of blade 13. To shift the guide outwardly, the slide element is pushed toward the blade. The edge of slot 31 working against pin 29 displaces stem 23 axially, carrying with it the guide 16 so as to open up a gap between the edge of the guide and the edge of the blade. To assist in correctly determining the thickness of the slice to be cut, the upper face of the slide element 25 near the end opposite from handle 28 is provided with a scale (shown in Fig. 6) which can be matched against an index line formed by the beveled portion 26a of cover 26. This scale can be made in units of one-eighth inch, one-quarter inch, or whatever is desired.

Figure 5:
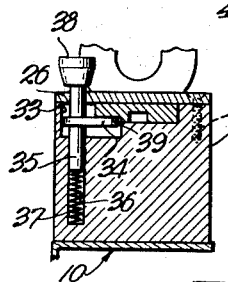
Fig. 5 is another fragmentary sectional view taken generally along the line 5—5 of Fig. 3 in the direction of the arrows.
Figure 7:
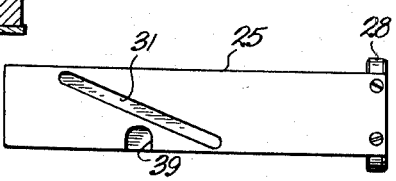
Fig. 7 is a view of the opposite side of said slide element from that shown in Fig. 6.

To provide a means for automatically indexing the gauge plate or thickness guide 16 in its safety position, that is the position in which it effectively shields and guards the edge of blade 13, there is provided a locking mechanism, the details of which are best observed in Figs. 5 and 7. It will be noted that hollowed out in block 21 to one side of the slide element 25 is a recess 33, the bottom of this recess extending below the bottom of the recess in which the slide is guided. Mounted within the enlarged recess 33 is a detent 34. Detent 34 is carried by a vertical plunger 35 which has its lower end slidably fitted within a bore 36. Within the lower end of bore 36 and below plunger 35 is a compression spring 37 which serves to constantly urge the detent 34 into contact with the lower face of the slide element 25. It will be noted that plunger 35 extends through the cover 26 and has on its upper end a thumb button 38, making it easy to depress the plunger.

When the guide 16 is in the safety position previously described, the detent engages within a recess 39 formed on the underside of the slide element 25. The recess 39 is of such size and shape to permit the entry thereinto of the detent as the slide moves into the designated position and to prevent further movement of the slide element or guide in either direction until the plunger 35 shall be depressed to disengage the detent from the recess. The thickness guide is therefore maintained in a position in which it shields the edge of the cutting blade and prevents direct edgewise contact therewith. As will be evident, when it is desired to release the thickness guide from the safety position, it is necessary only to push downwardly upon the finger button 38 and, while holding the button depressed, shift the slide sufficiently to withdraw the recess from the registering position with the detent. During normal operation, the detent rides against the underside of the slide element 25, but the spring 36 is not sufficiently strong to interfere with easy operation.

In order to make the entire mechanism work more smoothly and to prevent pressures against the gauge plate 16 from changing the setting, a compression spring 40 can be interposed within the bearing 22 to press outward on stem 23 and balance to a considerable extent such inward forces as may be applied. However, the strength of this spring should not be sufficient to in and of itself cause movement of the stem 23.

As will be evident the angle of slot 31 plays an important part in obtaining effective operation. It has been my experience that the best results from the standpoint of stability and yet free and easy movement are obtained if this angle is made within the range from 20 degrees to 35 degrees from a plane normal to the stem.

From the foregoing it will be evident that I have provided a thickness control mechanism having advantages over those previously known and that the blade safety arrangement is automatic in its indexing operation and can quickly be released. When slicing has been completed, the thickness guide can be returned to the safety position by merely pulling out slide 25 to its outer position at which time the recess 39 aligns itself with the detent 34 and the detent enters therein.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a slicing machine having a base, a rotary slicing blade on the base, and a thickness guide movable normal to the plane of the blade, the combination of a standard on the base and spaced from the blade, an elongate stem secured to the thickness guide, a bearing in the standard in which said stem is received in longitudinally slidable relationship, a slide element also slidably supported by said standard, said slide element disposed cross-wise of and movable in a path transverse to the path of the stem, connecting mechanism between said slide element and stem operable to cause longitudinal movement of the stem and its attached guide when said slide is shifted along its path, and means for releasably engaging said slide element at a pre-selected point in its path to prevent further movement of the slide and stem until said means is released.

2. The combination as in claim 1 wherein the last-named means includes a recess in said slide element and a detent positioned adjacent the slide and located to engage in said recess.

3. The combination as in claim 2 including resilient means urging the detent toward the slide to maintain it in light frictional engagement with the slide element and in the path of said recess.

4. The combination as in claim 1 including resilient means continually urging said stem in a direction to move the thickness guide toward the blade.

5. The combination as in claim 1 wherein said connecting mechanism includes a pin extending laterally from the stem with its end disposed in an elongate slot in the slide, said slot inclined with respect to a plane normal to the axis of the stem.

6. The combination as in claim 3 wherein said detent has a manual release plunger connected therewith and extending above the top of said housing for access by the operator.

7. In a food slicing machine of the type having a base, a rotary slicing blade mounted on said base in fixed relation thereto, said blade being shrouded about a portion of its circumference and leaving a cutting edge exposed for slicing purposes, and a thickness guide disposed generally parallel with the plane of said blade and to one side thereof and having one edge of arcuate form and closely adjacent the edge of the blade and shiftable in a direction generally normal to the plane of the blade to control the thickness of the slices produced, the combination of a standard on said base spaced from said blade; a thrust mechanism supported by said standard and connected with said guide for shifting the same, said mechanism including a stem extending from and rigid with the guide and mounted for slidable longitudinal movement in the standard, a slide element positioned cross-wise of the stem and slidably supported in said standard for movement transverse to said stem, and transmission means operable to move the stem in its path responsive to movement of the slide element in its path; a locking recess in said slide element; a locking detent supported by said standard and normally permitting free movement of said slide element when it is desired to adjust said thickness guide toward or away from said blade to change the thickness of the cut, but operable upon shifting of said slide to a position wherein said recess registers with said detent to releasably engage with said recess to prevent further shifting in either direction of said stem and said guide; said recess being so positioned that when the locking detent is engaged in said recess, said guide is the plane of the edge of the blade and shields the exposed portion of the edge.

8. The combination as in claim 7 wherein resilient means is provided for urging said detent into engagement with said element.

References Cited in the file of this patent
UNITED STATES PATENTS

| | | |
|---|---|---|
| 2,091,632 | Friedman | Aug. 31, 1937 |
| 2,851,074 | Talge et al. | Sept. 9, 1958 |